United States Patent
Hsiao

(10) Patent No.: US 8,053,367 B2
(45) Date of Patent: Nov. 8, 2011

(54) WAFER POLISHING METHOD

(75) Inventor: Wei-Min Hsiao, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 534 days.

(21) Appl. No.: 12/234,869

(22) Filed: Sep. 22, 2008

(65) Prior Publication Data

US 2009/0117832 A1    May 7, 2009

(30) Foreign Application Priority Data

Nov. 7, 2007   (TW) .............................. 96142073 A

(51) Int. Cl.
    *H01L 21/302*   (2006.01)
(52) U.S. Cl. ............ 438/692; 438/113; 438/690; 216/20
(58) Field of Classification Search .................. 438/691, 438/692, 693, 780, 782, 113, 114, 118, 690; 216/88, 89, 91, 20; 451/54, 57
See application file for complete search history.

(56) References Cited

U.S. PATENT DOCUMENTS

| | | | |
|---|---|---|---|
| 5,776,799 A * | 7/1998 | Song et al. | 438/118 |
| 6,703,075 B1 * | 3/2004 | Lin et al. | 427/256 |
| 7,217,640 B2 * | 5/2007 | Kurosawa et al. | 438/460 |
| 2005/0009366 A1 * | 1/2005 | Moore | 438/782 |

* cited by examiner

*Primary Examiner* — Lan Vinh
(74) *Attorney, Agent, or Firm* — J.C. Patents

(57) ABSTRACT

A wafer polishing method is provided. First, a wafer, having a first surface, a second surface, and a plurality of opening portions depressed on the first surface, is provided. A plastic adhesive is filled in the opening portions and cured later. A polishing step is performed to thin the thickness of the wafer. Therefore, the yield of the wafer in the polishing process can be improved by the protection of the plastic adhesive.

10 Claims, 4 Drawing Sheets

WAFER POLISHING METHOD

CROSS-REFERENCE TO RELATED APPLICATION

This application claims the priority benefit of Taiwan application serial no. 96142073, filed on Nov. 7, 2007. The entirety of the above-mentioned patent application is hereby incorporated by reference herein and made a part of specification.

BACKGROUND OF THE INVENTION

1. Field of the Invention

The present invention generally relates to a wafer polishing method, in particular, to a wafer polishing method capable of preventing wafer cracks.

2. Description of Related Art

Microelectromechanical system (MEMS) is a microelectromechanical component fabricated in a microminiaturized package structure, and the fabricating technique thereof is quite similar to the technique of fabricating integrated circuits (ICs). However, interactions, for example, about mechanics, optics, or magnetic force between the MEMS device and surrounding environment are more than that of the conventional IC.

The MEMS device may include micro-sized electromechanical components (for example, switches, mirrors, capacitors, accelerometers, sensors, capacitive sensors, or actuators etc.), and the MEMS device may be integrated with the IC in a manner of single block, thereby greatly modifying insertion loss or electrical isolation effect of the overall solid-state device. However, in the macroscopic world of the entire package structure, the MEMS device is extremely weak and may be impacted by slight static electricity or surface tension at any moment to cause failure. Therefore, in order to prevent the MEMS device from contaminations or damages, usually the MEMS device is sealed in a cavity of the wafer.

FIG. 1 is a schematic view of cracks generated in a conventional wafer polishing process. Referring to FIG. 1A, the wafer 100 has a plurality of lattice opening portions 102 (or cavities). However, in the polishing process, since the strength at regions A and B becomes weak, the regions A and B (for example, the edges) of the wafer are usually cracked, and silicon residue 104 easily clogs the opening portions 102. Therefore, the present invention is mainly directed to overcome serious defects such as cracks and residues occurred in the polishing process.

SUMMARY OF THE INVENTION

Accordingly, the present invention is directed to a wafer polishing method, which is contributive to overcome the conventional defects and improving the yield in the polishing process.

The present invention provides a wafer polishing method, which includes the following steps. A wafer, having a first surface, a second surface, and a plurality of opening portions depressed on the first surface, is provided, and the wafer has a thickness. A plastic adhesive is filled in the opening portions and cured later. A polishing step is performed for the wafer.

In an embodiment of the present invention, the opening portions are formed by dry etching, and depths of the opening portions are smaller than the thickness of the wafer. In another embodiment, the opening portions are formed by wet etching, and depths of the opening portions are smaller than or equal to the thickness of the wafer.

In an embodiment of the present invention, the process of filling a plastic adhesive in the opening portions includes adhesive dispensing or spin coating. A material of the plastic adhesive includes a liquid adhesive. In addition, the process of curing the plastic adhesive includes ultraviolet (UV)-thermal curing.

In an embodiment of the present invention, the process of performing a polishing step includes the following steps. A first adhesive tape is adhered to the first surface of the wafer. The second surface of the wafer is Polished until the opening portions and the plastic adhesive are exposed. The first adhesive tape and the plastic adhesive are removed.

In an embodiment of the present invention, before removing the first adhesive tape and the plastic adhesive, the method further includes inverting the wafer to make the first surface of the wafer face upward. Next, a second adhesive tape is adhered to the second surface of the wafer. Then, the plastic adhesive is heated, such that the plastic adhesive is heated to separate from the opening portions.

The present invention adopts the plastic adhesive, so as to provide an appropriate protection for the wafer in the polishing process, and relatively improve the yield of the wafer, and further the wafer after the polishing process has nondefective lattice opening portions.

In order to have a further understanding of the features and the advantages of the present invention, a detailed description is given as follows with the embodiment and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
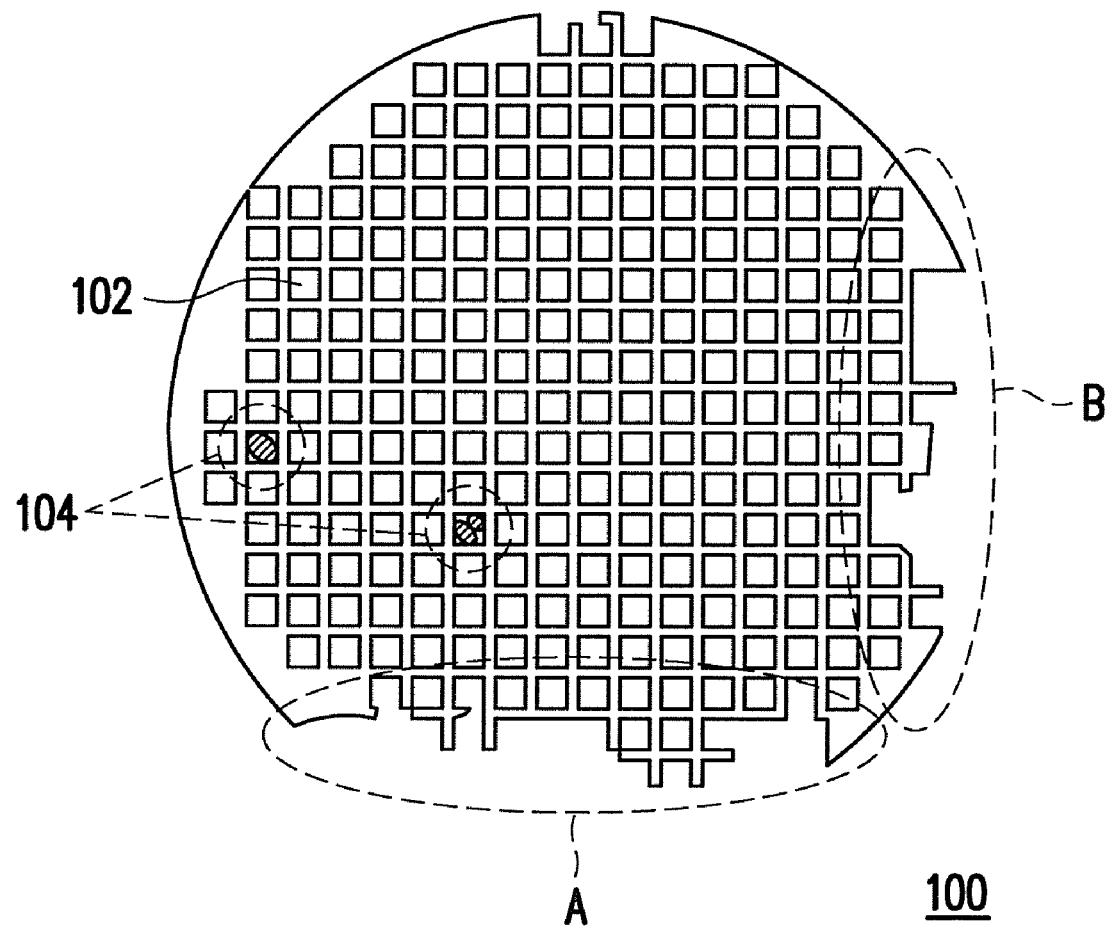
FIG. 1 is a schematic view of cracks generated in a conventional wafer polishing process.

Reference will now be made in detail to the present embodiments of the invention, examples of which are illustrated in the accompanying drawings. Wherever possible, the same reference numbers are used in the drawings and the description to refer to the same or like parts.

FIGS. 2A to 2F are schematic views of a wafer polishing method according to an embodiment of the present invention. The method includes the following steps.

First, in a first step, the wafer 200, having a first surface 202, a second surface 204, and a plurality of opening portions 206 depressed on the first surface 202, is provided. The wafer 200 has a thickness d.

Figure 2A:
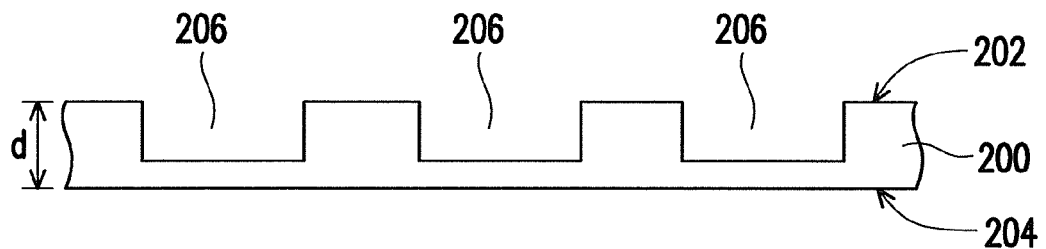
FIGS. 2A to 2F are schematic views of a wafer polishing method according to an embodiment of the present invention.

Referring to FIG. 2A, in the first step of this embodiment, a dry etching or a wet etching is performed on the first surface 202 of the wafer 200, so as to form a plurality of opening portions 206 (or cavities) on the first surface 202 of the wafer 200, and depths of the opening portions 206 are smaller than the thickness d of the wafer 200.

Next, in a second step, a plastic adhesive 210 is filled in the opening portions 206 and cured later. The plastic adhesive 210 is, for example, a liquid adhesive that is thermal curable.

Figure 2B:
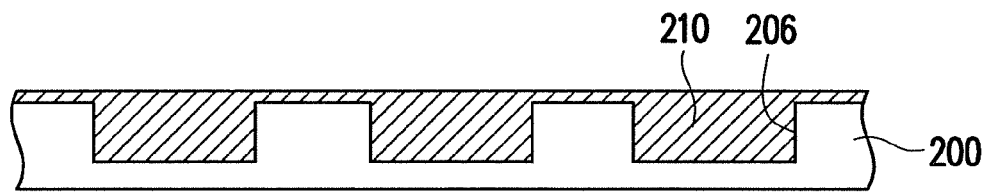

Referring to FIG. 2B, in the second step of this embodiment, the method of filling the plastic adhesive 210 in the opening portions 206 includes filling each opening portion 206 by the adhesive dispensing or spin coating process. The plastic adhesive 210 is cured through a crosslink reaction generated when heated or heated by UV light. The cured plastic adhesive 210 functions as a protection colloid covered on the wafer 200 and fills each opening portion 206. Thus, the strength of the wafer 200 will not become weak when the opening portions 206 are etched, thereby providing protection to the wafer 200.

Next, in a third step, a polishing step is performed, so as to thin the thickness d of the wafer 200. The polishing step includes the following processes. A first adhesive tape 220 is adhered to the first surface 202 of the wafer 200, and the second surface 204 of the wafer 200 is made to face upward. An overall polishing is performed on the second surface 204 of the wafer 200 with a polishing pad until the opening portions 206 and the plastic adhesive 210 are exposed. The first adhesive tape 220 and the plastic adhesive 210 are removed.

Figure 2C:
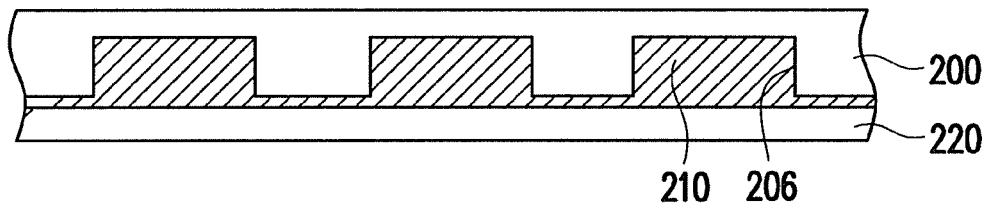
Figure 2D:
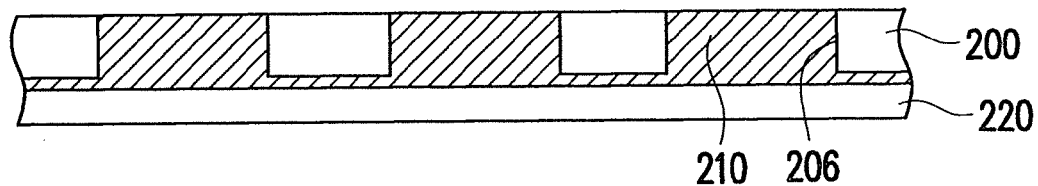

Referring to FIGS. 2C to 2D, in the third step of this embodiment, when the first adhesive tape 220 is adhered to the first surface 202 of the wafer 200, and the second surface 204 of the wafer 200 is made to face upward, the overall polishing is performed on the second surface 204 with a polishing pad of a chemical-mechanical polishing machine (not shown), so as to thin the thickness d of the wafer 200. At this time, the plastic adhesive 210 is filled in the opening portions 206 of the wafer 200, such that the silicon residue taken away by the polishing pad may leave the second surface 204 of the wafer 200 through a cleaning solution instead of clogging the opening portions 206. In addition, the plastic adhesive 210 provides the appropriate protection to the wafer 200 in the polishing process, such that the wafer 200 is not liable to generate cracks and other serious defects, thereby improving the yield.

Figure 2E:
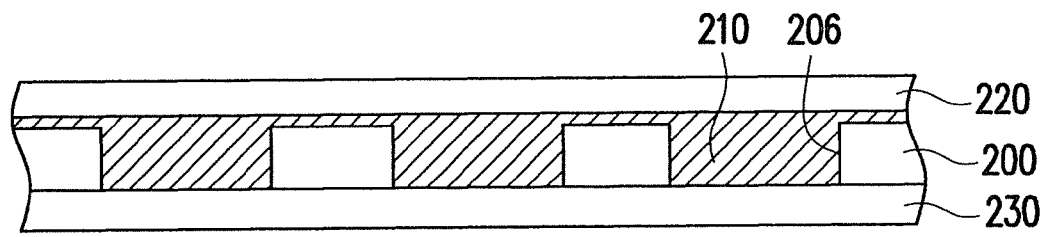
Figure 2F:
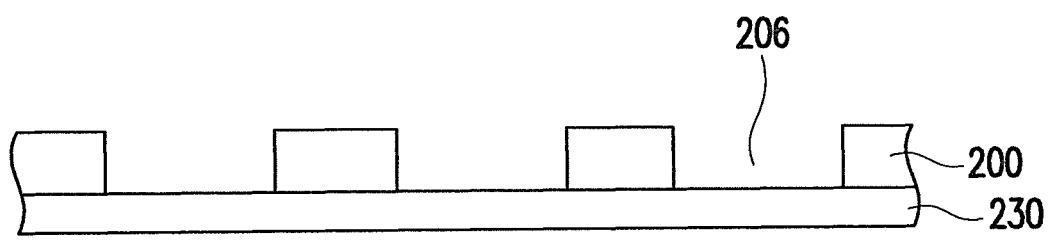

In FIGS. 2E to 2F, before removing the first adhesive tape 220 and the plastic adhesive 210, the wafer 200 is first inverted, such that the first surface 202 of the wafer 200 and the first adhesive tape 220 face upward. Next, a second adhesive tape 230 is adhered to the second surface 204 of the wafer 200. Finally, the first adhesive tape 220 and the plastic adhesive 210 are removed. It should be noted that the first adhesive tape 220 and the plastic adhesive 210 may be removed by heating the plastic adhesive 210. At this time, the adhesion strength of the plastic adhesive 210 becomes weak, and the plastic adhesive 210 shrinks under heating so as to easily separate from the opening portions 206. Therefore, after tearing off the first adhesive tape 220, the plastic adhesive 210 can be easily removed.

Figure 3A:
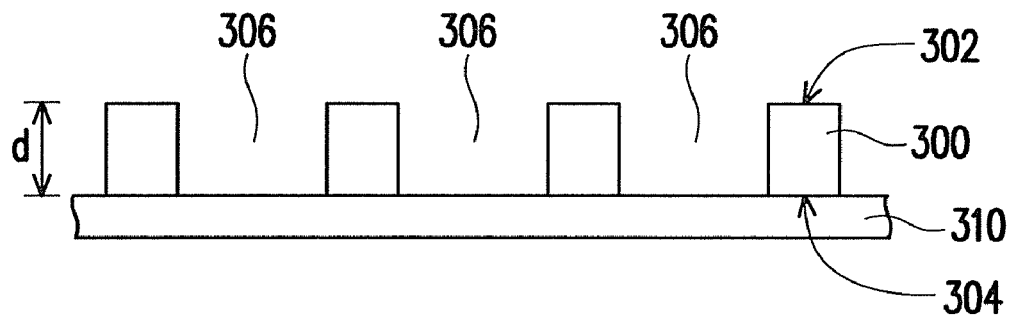
FIGS. 3A to 3C are schematic views of the wafer polishing method according to another embodiment of the present invention.
Figure 3B:
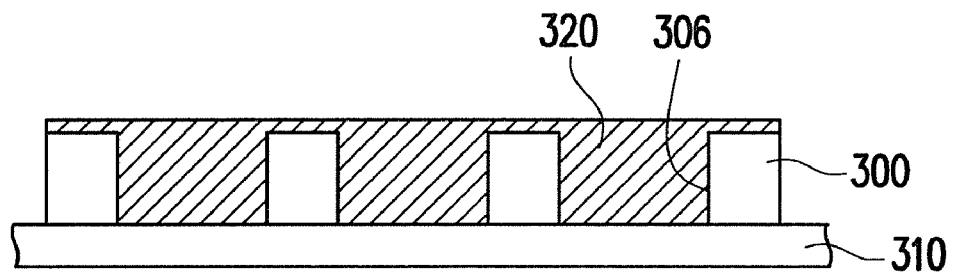
Figure 3C:
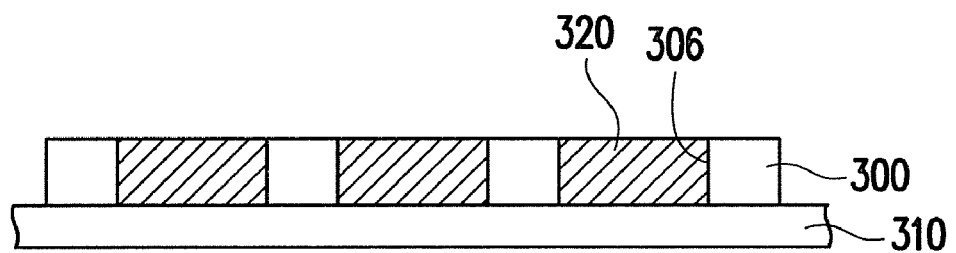

FIGS. 3A to 3C are schematic views of the wafer polishing method according to another embodiment of the present invention. When a wet etching capable of achieving a high aspect ratio is performed on a first surface 302 of a wafer 300 to form a plurality of opening portions (cavities) penetrating to a second surface 304, depths of the opening portions 306 are equal to the thickness d of the wafer 300. At this time, in a first step, the wafer 300 is adhered to the first adhesive tape 310. Then, in a second step, a plastic adhesive 320 is filled in the opening portions 306 and cured later. Next, in a third step, a polishing step is performed, so as to thin the thickness d of the wafer 300. Similarly, the plastic adhesive 320 provides a protection for the opening portions 306 of the wafer 300, such that the cracks, the silicon residue, and other serious defects will not easily occur, thereby improving the yield. In addition, the plastic adhesive 320 may be removed by heating that weakens the adhesion strength of the plastic adhesive 320, and the plastic adhesive 320 shrinks under heating and easily separate from the opening portions 306. Therefore, after tearing off the first adhesive tape 310, the plastic adhesive 320 can be easily removed.

In view of the above description, the present invention use the plastic adhesive to provide an appropriate protection to the wafer in the polishing process and relatively improve the yield of the wafer, such that the wafer after polishing has non-defective lattice opening portions (or cavities), for performing the subsequent packaging processes for MEMS system, thereby sealing the MEMS device in the cavities of the wafer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wafer polishing method, comprising:
providing a wafer comprising a first surface, a second surface, and a plurality of opening portions depressed on the first surface and the wafer having a thickness;
filling a plastic adhesive in the opening portions, and curing the plastic adhesive;
adhering a first adhesive tape to the first surface of the wafer;
performing a polishing step to polish the second surface of the wafer until the plastic adhesive filled in the opening portions is exposed;
heating the plastic adhesive to separate the plastic adhesive from the opening portions; and
removing the first adhesive tape and the plastic adhesive at the same time by peeling off the first adhesive tape.

2. The wafer polishing method according to claim 1, wherein the opening portions are formed by dry etching, and depths of the opening portions are smaller than the thickness of the wafer.

3. The wafer polishing method according to claim 1, wherein the opening portions are formed by wet etching, and depths of the opening portions are smaller than or equal to the thickness of the wafer.

4. The wafer polishing method according to claim 1, wherein the process of filling a plastic adhesive in the opening portions comprises adhesive dispensing or spin coating.

5. The wafer polishing method according to claim 1, further comprises adhering a second adhesive tape to the second surface of the wafer.

6. The wafer polishing method according to claim 1, wherein a material of the plastic adhesive comprises a liquid adhesive.

7. The wafer polishing method according to claim 1, wherein the process of curing the plastic adhesive comprises ultraviolet (UV)-thermal curing.

8. The wafer polishing method according to claim 1, wherein before polishing the second surface of the wafer, making the second surface of the wafer face upward.

9. The wafer polishing method according to claim 8, wherein before removing the first adhesive tape and the plastic adhesive, the method further comprises inverting the wafer to make the first surface of the wafer face upward.

10. The wafer polishing method according to claim 9, wherein after inverting the wafer, the method further comprises adhering a second adhesive tape to the second surface of the wafer.

* * * * *